(12) United States Patent
Thyroff et al.

(10) Patent No.: US 8,944,087 B2
(45) Date of Patent: Feb. 3, 2015

(54) EMERGENCY DRAINAGE DEVICE FOR ENCLOSED COMPARTMENTS

(71) Applicant: GM Global Technology Operations LLC, Detroit, MI (US)

(72) Inventors: Jurgen Thyroff, Harxheim (DE); Johannes Lauer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 13/780,870

(22) Filed: Feb. 28, 2013

(65) Prior Publication Data
US 2014/0239208 A1 Aug. 28, 2014

(51) Int. Cl.
*F16K 17/14* (2006.01)
*H01M 2/12* (2006.01)
*F16K 31/12* (2006.01)

(52) U.S. Cl.
CPC .................................. *F16K 31/12* (2013.01)
USPC ............................. 137/68.11; 137/67; 429/86

(58) Field of Classification Search
CPC ...................... H01M 8/04156; H01M 8/04171
USPC ........... 137/67, 68.11; 429/72, 82, 86, 55, 56; 220/89.1, 913, 571, 571.1; 215/358, 215/355, 364
See application file for complete search history.

(56) References Cited

U.S. PATENT DOCUMENTS 3,320,097 A * 5/1967 Sugalski ........................ 429/55
3,643,690 A * 2/1972 Sarai ............................ 137/587
4,131,722 A * 12/1978 Sugalski ........................ 429/55

* cited by examiner

*Primary Examiner* — Craig Schneider
*Assistant Examiner* — Craig J Price
(74) *Attorney, Agent, or Firm* — Brooks Kushman P.C.

(57) ABSTRACT

A drainage device for placement on a housing includes an external plug component and a liquid expandable component. The external plug component has a first cap section and a second attachment section. The first cap section is positionable over an exterior side of a housing wall. The first attachment section is adapted to attach the drainage device to an opening in the housing wall. The liquid expandable component contacts the external plug component and is adapted to contact a structure within the housing when the drainage device is placed on the housing. Characteristically, the liquid expandable component has a higher volume when contacted with liquid than when dry. The liquid expandable component pushes the internal plug component away from the structure within the housing when the liquid expandable component transitions from a non-liquid-containing state to a liquid containing state thereby providing a path for liquid to escape.

20 Claims, 5 Drawing Sheets

US 8,944,087 B2

EMERGENCY DRAINAGE DEVICE FOR ENCLOSED COMPARTMENTS

TECHNICAL FIELD

In at least one aspect, the present invention is related to battery module housings with improved water/coolant damage resistance.

BACKGROUND

Electrical equipment as such battery modules frequently contain delicate electronic equipment that is subject to water damage. In particular, flooding conditions can damage sensitive electronic components in such devices as battery module and fuel cells.

Battery powered vehicles invariable include sensitive electronic control components in addition to high voltage battery cells. These components are susceptible from water damage if the compartments in which they are contained should be flooded with water or the coolant used in such devices. Lithium ion batteries are an important type of battery technology used in such vehicles. Most battery assemblies, including lithium ion battery assemblies, include a plurality of individual electrochemical cells. Typically, such electrochemical cells include an anode, a cathode, and a separator interposed between the anode and cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction. For high power and high energy applications, a plurality of battery cells are utilized and assembled into a battery module. Moreover, such battery modules include a plurality of metallic (e.g., copper and/or aluminum) liquid cooled fins interspersed between battery cells. The battery assembles also control electronics that monitors charging and distribution of power to electronic devices. Potential risks for such battery assembles include creepage currents, short circuits, and fire due to coolant flooded housings after damage or leakage of battery coolant system.

Accordingly, there is a need for improved safeguards to mitigate the effects of water and coolant damage in electronic devices found in battery operated vehicles.

SUMMARY

The present invention solves at least one problem of the prior art by providing in at least one embodiment a drainage device for attachment to a housing having a housing wall with at least one orifice defined therein. The drainage device includes an external plug component, an internal plug component, and a liquid expandable component. The external plug component has a first cap section and a first attachment section. The first cap section is positionable over an external side of the housing wall. The internal plug component has a second cap section and a second attachment section. The second cap section is positionable over an internal side of the housing wall. The second attachment section mates the first attachment section to define a hollow cavity. The internal plug component defines a flow orifice that allows liquid to flow into the hollow cavity. The liquid expandable component is positioned in the hollow cavity. Characteristically, the liquid expandable component has a higher volume when contacted with liquid than when dry such that the liquid expandable component pushes the internal plug component and the external plug component apart when the liquid expandable component transitions from a non-liquid-containing state to a liquid containing state thereby providing a path for liquid to escape from the housing.

In another embodiment, a drainage device for placement on a housing is provided. The housing includes a housing wall with at least one device orifice defined therein. The drainage device includes an external plug component and a liquid expandable component. The external plug component has a first cap section and a second attachment section. The first cap section is positionable over an exterior side of the housing wall. The first attachment section is adapted to attach the drainage device to an opening in the housing wall. The liquid expandable component contacts the external plug component and is adapted to contact a structure within the housing when the drainage device is placed on the housing. Characteristically, the liquid expandable component has a higher volume when contacted with liquid than when dry. The liquid expandable component pushes the internal plug component away from the structure within the housing when the liquid expandable component transitions from a non-liquid-containing state to a liquid containing state thereby providing a path for liquid to escape.

In another embodiment, a housing incorporating one or more of the drainage devices set forth above is provided. The housing includes a housing wall in which a drainage device is mounted in an opening.

BRIEF DESCRIPTION OF THE DRAWINGS

Exemplary embodiments of the present invention will become more fully understood from the detailed description and the accompanying drawings, wherein.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

Figure 1A:
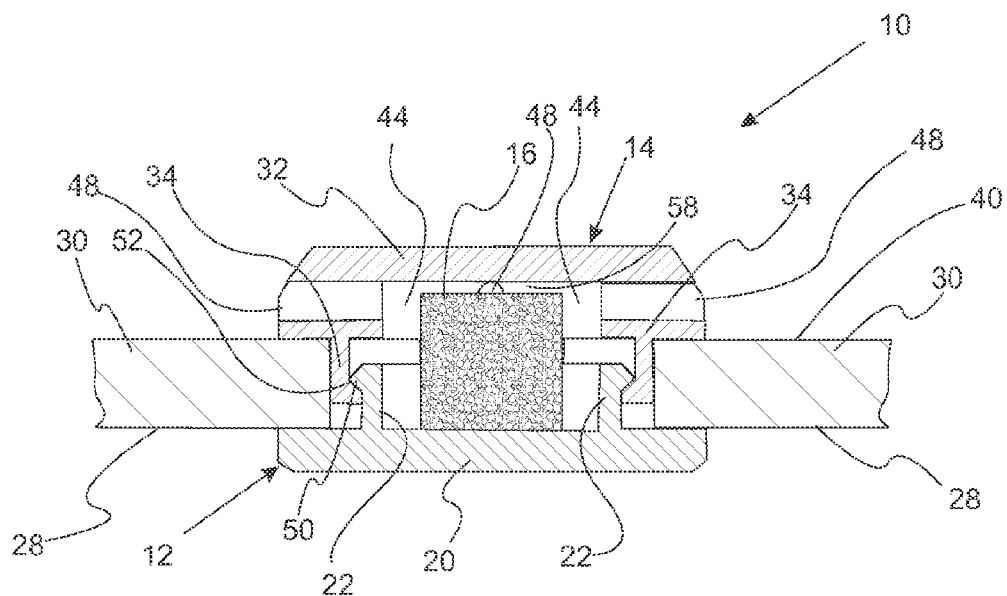
FIG. 1A is a cross sectional view of a drainage device for an electrical housing or enclosed compartment.
Figure 1B:
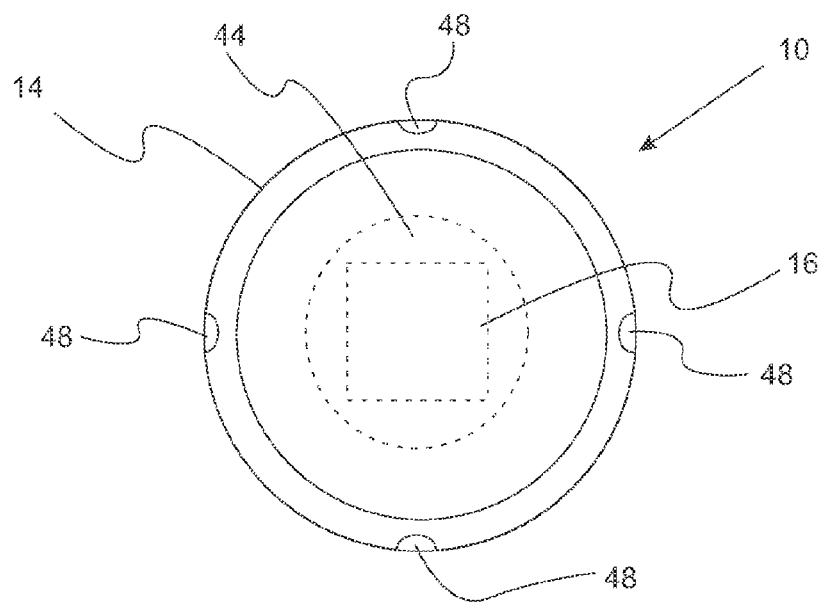
FIG. 1B is a top view of the drainage device of FIG. 1A.
Figure 2:
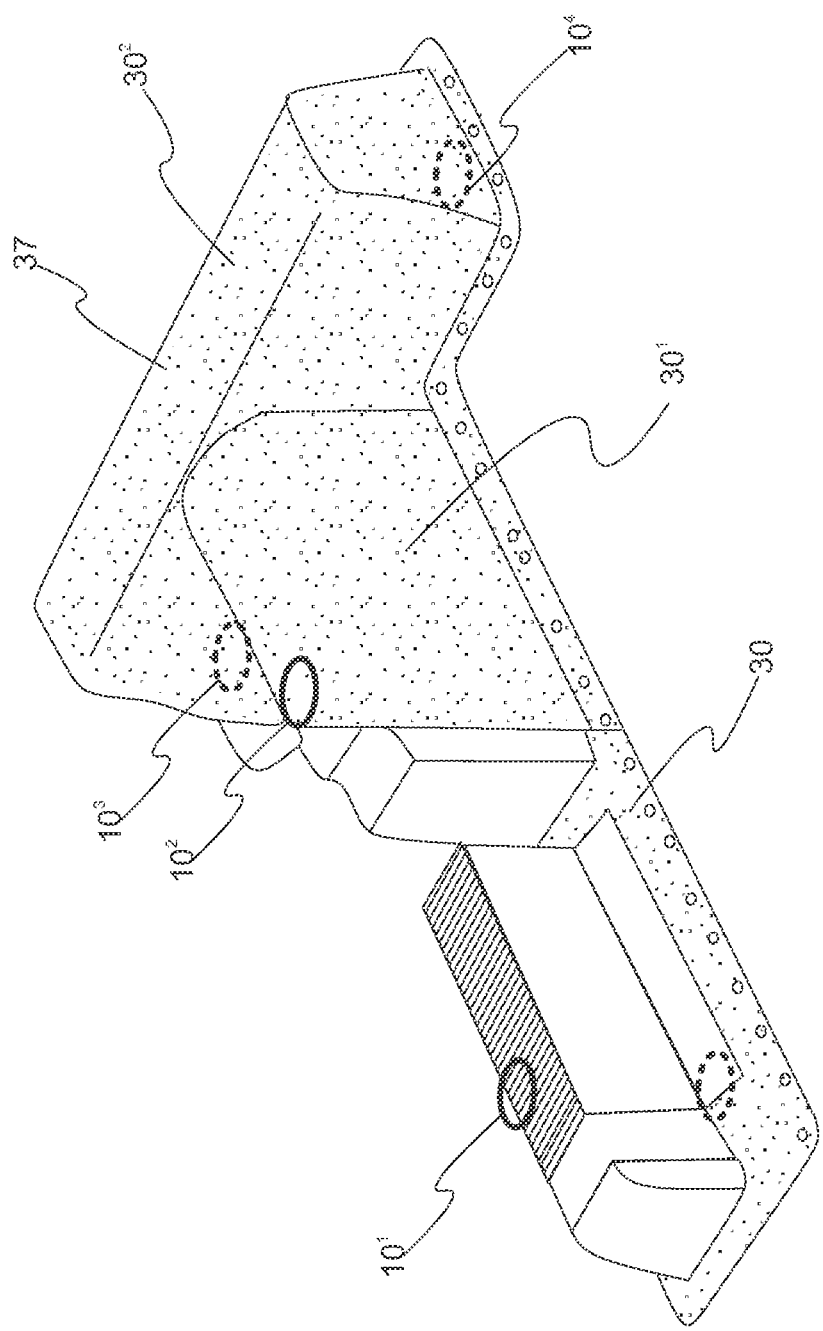
FIG. 2 is a perspective view of a housing with drainage devices and electrical components therein.

With reference to FIGS. 1 and 2, a drainage device for attachment to a housing having a housing wall is provided. FIG. 1A is a cross sectional view of the drainage device while FIG. 1B is a top view of the drainage device. FIG. 2 is a perspective view of a housing with drainage devices and electrical components therein. As used herein, the term "housing" and "enclosed compartment" are used interchangeably. The present embodiment is particularly useful for electrical housing such as those used for battery modules and fuel cells. Drainage device 10 includes external plug component 12, internal plug component 14, and liquid expandable component 16. External plug component 12 includes first cap section 20 and first attachment section 22. As used herein a cap section is the end of a plug component and an attachment section is that region of a plug component having features to facilitate attachment. First cap section 20 is positionable over external side 28 of the housing wall 30 of housing 37. In a refinement, cap section is disposed over and contact external side 28 in order to effectuate a seal. Internal plug component 14 includes second cap section 34 and second attachment section 34. Second cap section 32 is positionable over internal side 40 of housing wall 30. In a refinement, second cap section 32 has a portion that is disposed over and contact internal side 40 in order to effectuate a seal. The second attachment section 34 mates to the first attachment section 22 to define a hollow cavity 44. Internal plug component 14 defines flow orifices 48 that allows liquid to flow into hollow cavity 44.

In a refinement, first attachment section 22 includes first attachment feature 50 and second attachment section 36 has a second attachment feature 52 each of which extend around the circumference of the respective attachment section. First attachment feature 50 mates to second attachment feature 52. In a further refinement, first attachment feature 50 and second attachment feature 52 each independently include protrusions or grooves. FIG. 1A depicts an example in with attachment feature 50 is a protrusion and attachment feature 52 is a groove. It should be appreciated that these configurations may be switched.

Still referring to FIGS. 1A, 1B, and 2, liquid expandable component 16 is positioned in the hollow cavity 44. In a variation, one or both of first attachment section 22 and second attachment section 36 is hollow. Specifically, these sections can be a generally cylindrical hollow extension from their respective cap sections. Characteristically, liquid expandable component 16 has a higher volume when contacted with liquid than when dry such that liquid expandable component 16 pushes internal plug component 14 and external plug component 12 apart when the liquid expandable component 16 transitions from a non-liquid-containing state to a liquid containing state thereby providing a path for liquid to escape from housing 37. The term dry as used herein means that liquid expandable component 16 does not substantially contain (i.e., less than 5 weight percent) any liquid or have liquid imbibed therein. Typically liquids that may be present in housing 37 include water and in the case of battery modules, liquid coolants (e.g., ethylene glycol and the like). In a refinement, liquid expandable component 16 pushes internal plug component 14 and external plug component 12 apart when the liquid expandable component 16 transitions from a non-liquid-containing state to a liquid containing state to a sufficient extent that external plug component 12 disengages (i.e., separated from) internal plug component 14. It should be pointed out that there may or may not be a clearance 58 between liquid expandable component 16 and the surface that are pushed against during expansion. In a refinement clearance 58 is from 0 to 5 mm.

In a refinement, the ability of the external plug component 12 and internal plug component 14 to be pushed apart by an expanding liquid expandable component 16 is facilitated by forming these components from an elastomeric material such as elastomeric rubbers and elastomeric plastics. Examples of suitable elastomeric rubbers include, but are not limited to, natural polyisoprene rubbers, synthetic polyisoprene rubber, butadiene rubber, chloroprene rubber, butyl rubbers, halogenated butyl rubbers, styrene-butadiene rubber, nitrile rubbers, ethylene propylene rubber (EPM), ethylene propylene diene rubber (EPDM), polyacrylic rubber, silicone rubbers, fluoroelastomers, ethylene-vinyl acetate, and the like. In a refinement, liquid expandable component increases in volume by at least 50 percent when saturated with the liquid. In a further refinement, liquid expandable component increases in volume from about 50 percent to 100 percent or more when saturated with the liquid. In still another refinement, liquid expandable component 16 increases in volume such that a force from about 20 N to 35 N or more is generated between the internal plug component and the external plug component when the liquid expandable component is saturated with liquid. In yet another refinement, liquid expandable component 16 increases in volume such that a force from about 20 N to 30 N or more is generated between the internal plug component and the external plug component when the liquid expandable component is saturated with liquid.

In a variation, liquid expandable component 16 comprises a sponge. Examples of sponge materials from which liquid expandable component 16 is constructed include, but is not limited to, foamed polymers such as low-density polyether, polyvinyl acetate, polyester, and the like and cellulosic fibers, polyurethane, and sponge.

Still referring to FIG. 2, it should be appreciated that drainage device 10 is positionable at any number of positions on housing 37. FIG. 2 illustrates the positioning of drainage devices $10^1$, $10^2$, $10^3$, and $10^4$. Drainage devices $10^1$, $10^2$, $10^3$, and $10^4$ may be of the design set forth in FIGS. 1A and 1B or of the designs described in more detail below in connection with the descriptions of FIGS. 3A and 3B (drainage device 70) or of FIGS. 4A and 4B (drainage device 120). Positioning on the top, bottom, and sides of housing 37 allow drainage in the event of a change in attitude of the housing such as if a vehicle flips over.

Figure 3A:
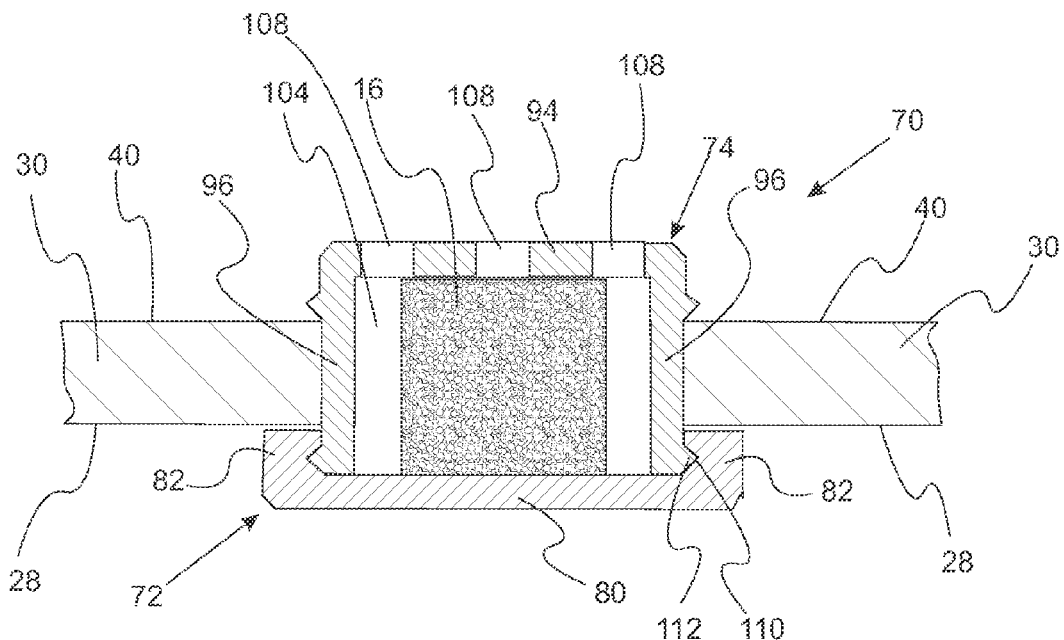
FIG. 3A is a cross sectional view of an alternative drainage device.
Figure 3B:
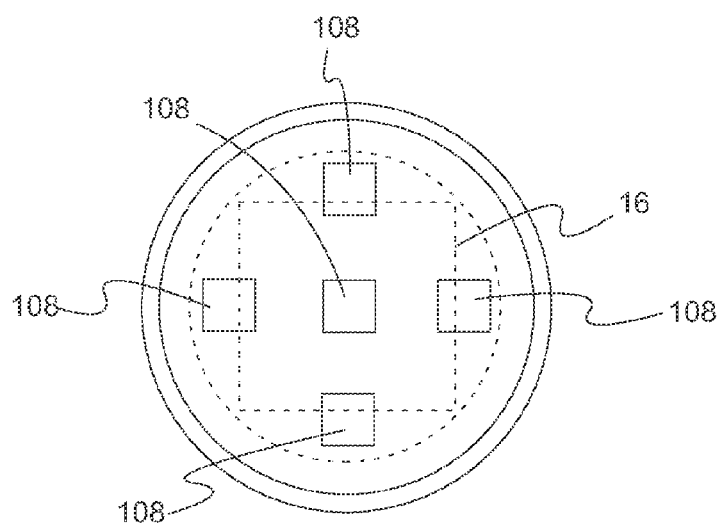
FIG. 3B is a top view of the drainage device of FIG. 3A.

With reference to FIGS. 3A, 3B, and 2, a variation of a drainage device for attachment to a housing is schematically illustrated. FIG. 3A is a cross sectional view of a drainage device that is attachable from the exterior side of the housing. FIG. 3B is a top view of this drainage device. Drainage device 70 includes external plug component 72, internal plug component 74, and liquid expandable component 16. External plug component 72 includes first cap section 80 and first attachment section 82. In this variation, first cap section 80 and first attachment section 82 are positionable over external side 28 of the housing wall 30 of housing 37. Internal plug component 74 includes second cap section 94 and second attachment section 96. Second cap section 94 is positionable over internal side 40 of housing wall 30. The second attachment section 96 mates to the first attachment section 82 to define a hollow cavity 104. Internal plug component 74 defines flow orifices 108 that allows liquid to flow into hollow cavity 104.

In a refinement as set forth above, first attachment section 82 includes first attachment feature 110 and second attachment section 96 has a second attachment feature 112. First attachment feature 110 mates to second attachment feature 112. In a further refinement, first attachment feature 110 and second attachment feature 112 each independently include protrusions or grooves extending around a circumference of the relevant attachment section. FIG. 3A depicts an example in with attachment feature 110 is a groove and attachment feature 112 is a protrusion.

Still referring to FIGS. 3A, 3B, and 2, liquid expandable component 16 is positioned in the hollow cavity 104. In a variation, one or both of first attachment section 82 and second attachment section 96 is hollow. Specifically, these sections can be a generally cylindrical hollow extension from their respective cap sections. As set forth above, liquid expandable component 16 has a higher volume when contacted with liquid than when dry such that liquid expandable component 16 pushes internal plug component 74 and external plug component 72 apart when the liquid expandable component 16 transitions from a non-liquid-containing state to a liquid containing state thereby providing a path for liquid to escape from housing 37. In further refinement, liquid expandable component 16 pushes internal plug component 74 and external plug component 72 apart when the liquid expandable component 16 transitions from a non-liquid-containing state to a liquid containing state to a sufficient extent that external plug component 72 disengages internal plug component 74. The details of the liquid expandable component are the same as that set forth above with respect to the descriptions of FIGS. 1A and 1B, including the details regarding the clearance and the materials from which it is formed.

Figure 4A:
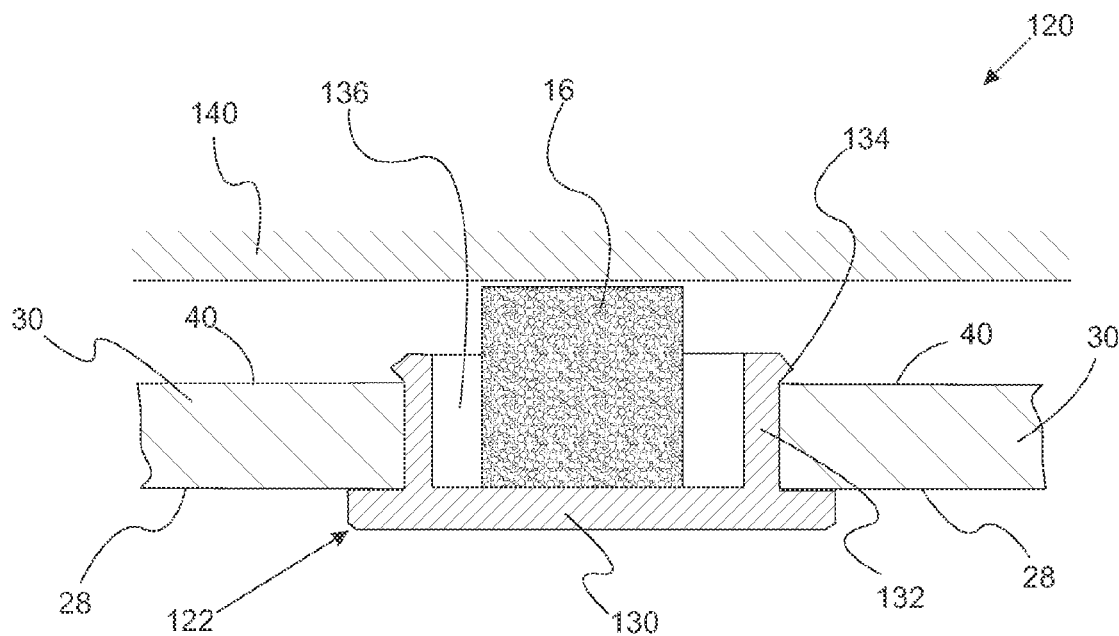
FIG. 4A is a cross sectional view of an alternative drainage device.
Figure 4B:
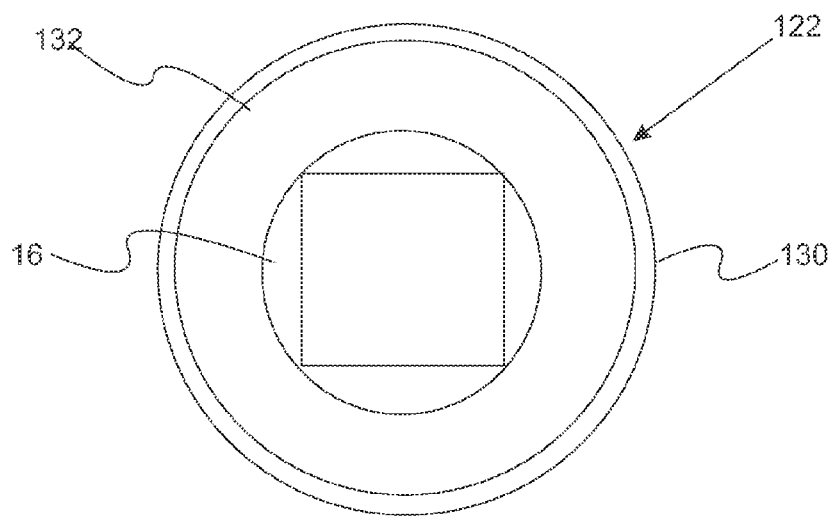
FIG. 4B is a top view of the drainage device of FIG. 4A.

With reference to FIGS. 4A, 4B, and 2, another variation of a drainage device for attachment to a housing is schematically illustrated. FIG. 4A is a schematic cross section of a drainage device that pushes against a component internally mounted in the housing. FIG. 4B is a top view of an external plug used in the drainage device. Drainage device 120 includes external plug component 122 and liquid expandable component 16. External plug component 122 includes first cap section 130 and first attachment section 132. In this variation, first cap section 130 is positionable over external side 28 of housing wall 30 of housing 37. In a refinement, first attachment section 132 includes first attachment feature 134 which spans the circumference of the first attachment section. First attachment feature 134 secures external plug component 122 to housing wall 30 and is depicted as a protraction in FIG. 4A. Liquid expandable component 16 is positioned in the hollow cavity 136 formed in attachment section 132. As set forth above, liquid expandable component 16 has a higher volume when contacted with liquid than when dry such that liquid expandable component 16 pushes internal plug component 122 and component 140 recurred inside the housing when the liquid expandable component 16 transitions from a non-liquid-containing state to a liquid containing state thereby providing a path for liquid to escape from housing 37. In further refinement, liquid expandable component 16 pushes external plug component 122 and component 140 apart when the liquid expandable component 16 transitions from a non-liquid-containing state to a liquid containing state to a sufficient extent that external plug component 122 disengages from housing 37. The details of the liquid expandable component are the same as that set forth above with respect to the descriptions of FIGS. 1A and 1B, including the details regarding the clearance and the materials from which it is formed.

Figure 5:
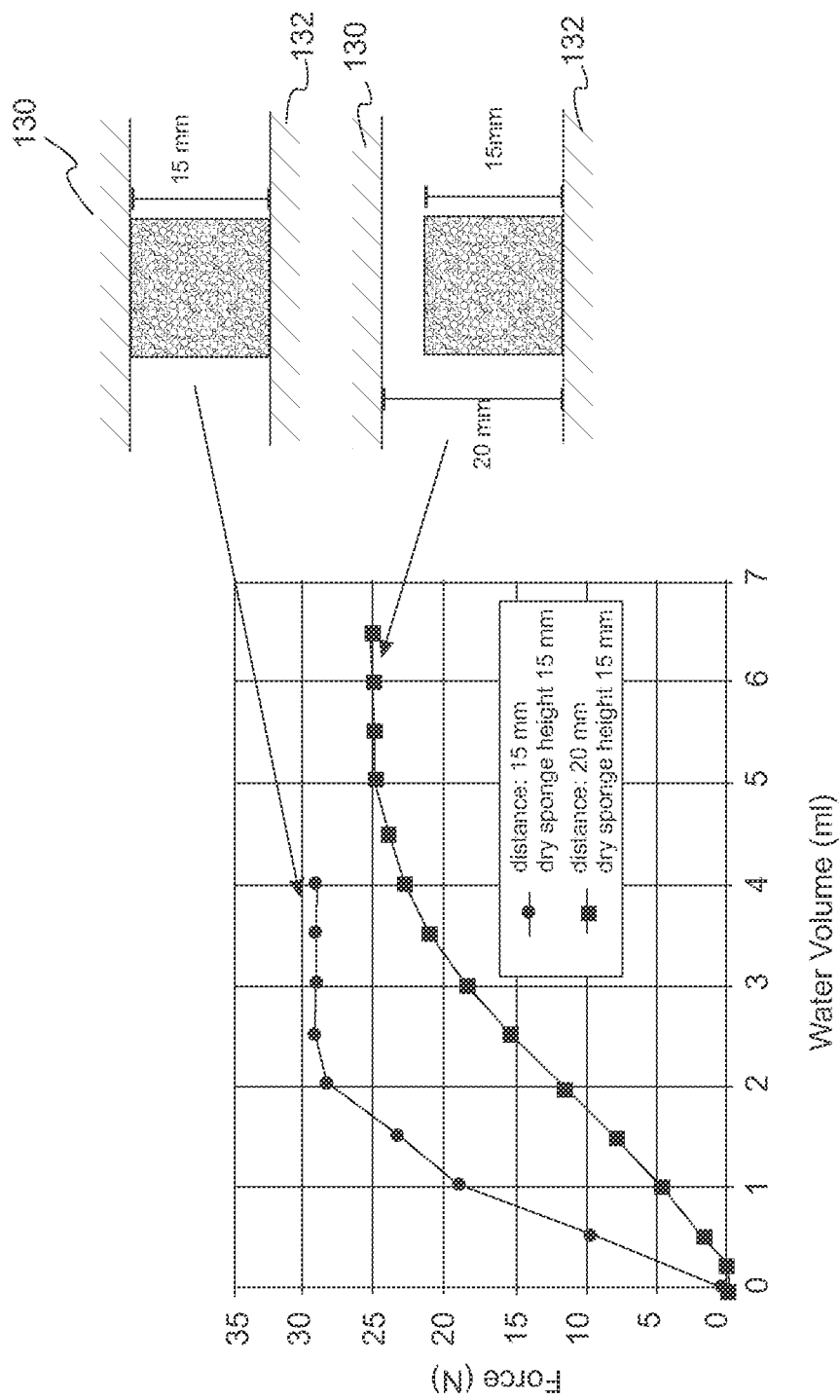
FIG. 5 is a plot showing the force developed by a water expanding sponge.

With reference to FIG. 5, plots demonstrating that the force developed by a water expanding sponge is sufficient to push the plug components set forth above are provided. The measurement set forth in FIG. 5 were determined by measuring the force developed between a fixed member 130 and a scale 132 for various loadings of liquid (e.g. water). It is observed that even with a clearance of 5 mm between sponge 131 and member 130 sufficient force (20 N to 30 N) is developed for the applications set forth above. Since developed force depends on the cross section of the sponge, in the experiment of FIG. 1a piece of sponge with the cross-sectional dimension of 20 mm*20 mm was used. Generally, the size or volume of the sponge is designed in such a way that the expansion forces of the liquid containing sponge overcome the attachment and friction forces of the plugs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A drainage device for attachment to a housing, the drainage device comprising:
   an external plug component having a first cap section and a first attachment section, the first cap section positionable in an opening in the housing with the first cap section disposed over an exterior side of a housing wall;
   an internal plug component having a second cap section and an second attachment section, the second cap section positionable over an interior side of the housing wall, the second attachment section mating to the first attachment section to define a hollow cavity, the internal plug component defining a flow orifice allowing liquid to flow into the hollow cavity; and
   a liquid expandable component positioned in the hollow cavity, the liquid expandable component having a higher volume when contacted with liquid than when dry, the liquid expandable component pushes the internal plug component and the external plug component apart when the liquid expandable component transitions from a dry state to a liquid containing state thereby providing a path for liquid to escape.

2. The drainage device of claim 1 wherein at least one of the internal plug component and the external plug component comprises an elastomeric material.

3. The drainage device of claim 1 wherein the liquid expandable component pushes the internal plug component and the external plug component apart when the liquid expandable component transitions from dry state to a liquid containing state such that the internal plug component disengages the external plug component.

4. The drainage device of claim 1 wherein one or both of the first attachment section and second attachment section is hollow.

5. The drainage device of claim 1 wherein the liquid expandable component comprises a sponge.

6. The drainage device of claim 1 wherein the liquid expandable component increases in volume by at least 50 percent when saturated with the liquid.

7. The drainage device of claim 1 wherein the liquid expandable component increases in volume such that a force from about 20 N to 35 N is generated between the internal plug component and the external plug component when the liquid expandable component is saturated with liquid.

8. The drainage device of claim 1 wherein the liquid is water or a liquid battery coolant.

9. The drainage device of claim 1 wherein the first attachment section includes a first attachment feature and the second attachment section has a second attachment feature, the first attachment feature mating to the second attachment feature.

10. The drainage device of claim 9 wherein the first attachment feature and the second attachment feature each independently include protrusions or grooves.

11. The drainage device of claim 1 wherein the liquid expandable component is positioned in the hollow cavity with a clearance from 0 to 5 mm.

12. A drainage device for attachment to a housing, the drainage device comprising:
an external plug component having a first cap section and a first attachment section, the external plug component positionable in an opening in the housing with the cap section positionable over an exterior side of a housing wall, the attachment section adapted to attach the drainage device to the opening in the housing wall; and
a liquid expandable component contacting the external plug component and adapted to contact a structure within the housing when the drainage device is placed on the housing, the liquid expandable component having a higher volume when contacted with liquid than when dry, the liquid expandable component pushing the external plug component away from the structure within the housing when the liquid expandable component transitions from a non-liquid-containing state to a liquid containing state thereby providing a path for liquid to escape.

13. The drainage device of claim 12 further comprising an internal plug component having a second cap section and an second attachment section, the internal plug component being the structure within the housing, the second cap section being positionable over an interior side of the housing wall, the second attachment section mating to the first attachment section to define a hollow cavity, the internal plug component defining a flow orifice allowing liquid to flow into the hollow cavity.

14. The drainage device of claim 12 wherein the external plug component comprises an elastomeric material.

15. The drainage device of claim 12 wherein the liquid expandable component comprises a sponge.

16. A housing comprising:
a first housing wall with at least one device opening defined therein; and
a drainage device positioned in the device opening, the drainage device comprising:
an external plug component having a first cap section and a first attachment section, the first cap section positionable over an exterior side of the housing wall, the attachment section adapted to attach the drainage device to the device opening; and
a liquid expandable component contacting the external plug component and adapted to contact a structure within the housing when the drainage device is placed on the housing, the liquid expandable component having a higher volume when contacted with liquid than when dry, the liquid expandable component pushing the external plug component away from the structure within the housing when the liquid expandable component transitions from a non-liquid-containing state to a liquid containing state thereby providing a path for liquid to escape.

17. The housing of claim 16 wherein the drainage device further comprises an internal plug component having a second cap section and an second attachment section, the internal plug component being the structure within the housing, the second cap section being positionable over an interior side of the housing wall, the second attachment section mating to the first attachment section to define a hollow cavity, the internal plug component defining a flow orifice allowing liquid to flow into the hollow cavity.

18. The housing of claim 16 wherein the external plug component comprises an elastomeric material.

19. The housing of claim 17 wherein the liquid expandable component comprises a sponge.

20. The housing of claim 17 further comprising a second housing wall with a second drainage device attached thereto.

* * * * *